US006748279B2

(12) United States Patent
Bennett

(10) Patent No.: US 6,748,279 B2
(45) Date of Patent: Jun. 8, 2004

(54) METHOD FOR IMPROVING A MANUFACTURING PROCESS BY CONDUCTING A FULL FACTORIAL EXPERIMENT TO OPTIMIZE PROCESS VARIABLE SETTINGS

(75) Inventor: Carl Bennett, Bellevue, WA (US)

(73) Assignee: Red X Technologies, Inc., Carson City, NV (US)

( * ) Notice: Subject to any disclaimer, the term of this patent is extended or adjusted under 35 U.S.C. 154(b) by 322 days.

(21) Appl. No.: 09/775,313

(22) Filed: Jan. 31, 2001

(65) Prior Publication Data

US 2002/0151989 A1 Oct. 17, 2002

(51) Int. Cl.[7] ................................. G05B 13/02
(52) U.S. Cl. ......................... 700/28; 700/51; 700/52; 318/561
(58) Field of Search ..................... 700/28, 51, 52, 700/73, 33, 34; 703/22; 318/561

(56) References Cited

U.S. PATENT DOCUMENTS 5,243,546 A * 9/1993 Maggard ................ 702/90
6,159,255 A * 12/2000 Perkins .................. 44/300

FOREIGN PATENT DOCUMENTS

EP 0614533 * 11/1995 ........... G01R/35/00

OTHER PUBLICATIONS

A. Hoskuldsson, "PLS Regression Methods," J. Chemometrics, vol. 2, p. 211–228, 1998.*
J. Sun, "Statistical Analysis of NIR Data: Data Pretreatment," J. Chemom. 11, p. 525–532, 1997.*
F. Juskey, "Full Factorial Experimentation: the New Industrial tool," Printed Circuit Assembly, vol. 4, p. 46–47, 53, Apr. 1990.*

Box et al, "Statistics for Experimenters: An Introduction to Design, Data Analysis, and Model Building," John Wiley & Sons, New York, 1978.*
R. McLean et al, "Applied Factorial and Fractional Designs," Marcel Dekker, Inc., New York, 1984.*
S.E. Prasad et al, "The Role of Statistical Design in the Development of Electrostrictive Materials," Applications of Ferroelectric 1994.ISAF '94., Proceedings of the Ninth IEEE International Symposium, Aug. 7–10, 1994.*
O. Davies, ed., "The Design and Analysis of Industrial Experiments," Longman Group Limited, New York, 1978.*
Ott, Ellis Raymond et al., Ed., *Process Quality Control: Troubleshooting and Interpretation of Data*, Third Edition, The McGraw–Hill Companies, Inc., United States of America, 2000, Ch. 10, "Some Concepts of Statistical Design of Experiments", pp. 293–312.
Tukey, John W., *A Quick, Compact, Two–Sample Test To Duckworth's Specifications*, Technometrics, 1(1):31–48, Feb. 1959.

* cited by examiner

Primary Examiner—Ramesh Patel
Assistant Examiner—Aaron C Perez-Daple
(74) Attorney, Agent, or Firm—White & Case LLP; Scott T. Weingaertner

(57) ABSTRACT

A factorial experiment is conducted on a manufacturing process to generate a response matrix. The responses are used to calculate individual contrasts in a document as well as replicates effects. The contrast sums are also calculated and displayed in the document. The largest of the contrast sums are identified, and effects associated with those contrast sums are tested for significance using an end count method. The information from the process transformed into "significant effects" information is used to adjust process variables to improve the manufacturing process by avoiding the effect or imparting it to a measurable response of the process.

9 Claims, 15 Drawing Sheets

|  |  | A− | A+ |
|---|---|---|---|
| C− | B− | 12<br>10<br>(1) | 4<br>3<br>a |
| C− | B+ | 12<br>11<br>b | 5<br>4<br>ab |
| C+ | B− | 6<br>7<br>c | 22<br>23<br>ac |
| C+ | B+ | 6<br>5<br>bc | 22<br>21<br>abc |

|        | −A          | +A          |
|--------|-------------|-------------|
| −B     | 1<br>1<br>2<br>1<br>(1) | 2<br>3<br>3<br>3<br>a |
| +B     | 2<br>1<br>1<br>3<br>b | 9<br>11<br>10<br>11<br>ab |

| Yates Order | Y (bar) | 1 | 2 | Div 2 |
|---|---|---|---|---|
| (1) | $Y_1$ | $Y_1+Y_2$ | $Y_1+Y_2+Y_3+Y_4$ | |
| a | $Y_2$ | $Y_3+Y_4$ | $Y_1-Y_2+Y_3-Y_4=Qa$ | $Qa/2$ |
| b | $Y_3$ | $Y_2-Y_1$ | $Y_3+Y_4-Y_1+Y_2=Qb$ | $Qb/2$ |
| ab | $Y_4$ | $Y_4-Y_3$ | $Y_4-Y_3-Y_2+Y_1=Qab$ | $Qab/2$ |

*Fig. 12*

| Cell | Y | Y | Y | Y | Y(bar) | 1 | 2 | Div 2 | Rank |
|---|---|---|---|---|---|---|---|---|---|
| (1) | 1 | 1 | 2 | 1 | 1.25 | 4 | 16 | | |
| a | 2 | 3 | 3 | 3 | 2.75 | 12 | 10 | 5 | 1 |
| b | 2 | 1 | 1 | 3 | 1.75 | 1.5 | 8 | 4 | 2 |
| ab | 9 | 11 | 10 | 11 | 10.25 | 8.5 | 7 | 3.5 | 3 |
| | | | | | 16 | | | | |

Fig. 13

Top view of a 2^2 plane

US 6,748,279 B2

METHOD FOR IMPROVING A MANUFACTURING PROCESS BY CONDUCTING A FULL FACTORIAL EXPERIMENT TO OPTIMIZE PROCESS VARIABLE SETTINGS

BACKGROUND OF THE INVENTION

In the improvement of manufacturing processes and products it is often necessary to employ empirical methods or techniques. In most basic terms, this typically involves observing the effects of variables in a product or process and using the information observed from those effects to adjust or manipulate the variables, resulting in an improved or satisfactory product or process. However, where there are many variables with a multitude of possible effects on the process or product, arriving at improvements is more difficult.

Industrial methods of design and analysis of experiments have been developed to assist in transforming data and improving manufacturing processes. However, in practical applications, field experience has shown that existing methods do not yield adequate solutions. There is a need for a simple and easy to use method that transforms experimental field data into more revealing and practical information that can be used to improve processes and products.

SUMMARY OF THE INVENTION

The present invention provides a method of manufacturing or improving a manufacturing process. In addition, the method can be applied in the design of a manufacturing process or product.

In one embodiment described herein, a full factorial experiment is conducted with a plurality of process variables with each of the variables being tested at a plurality of settings, in a plurality of combinations of settings. Measurements of the response of the process for each combination of level settings are recorded.

The responses of the full factorial experiment are used to calculate individual contrasts for each process variable and each interaction among the process variables. The individual contrasts are each displayed at a particular location in a document, or other form of display, corresponding to a particular notation.

The individual contrasts of each process variable and each interaction are added to generate separate contrast sums which are also displayed in the document. In addition, effects estimates for each of the contrast sums are displayed.

Contrast sums are identified that are greater than at least one of the other contrast sums by a factor of about 2. If the contrast sum is that of an interaction effect between a plurality of process variables, the interaction is verified by referring to the document. The document provides information as to whether both variables of the interaction must be set at the levels of the interaction to impart an effect substantially equal to the effect of the interaction.

Furthermore, when at least two trials for the full factorial experiment are conducted, replicate effects can be generated. The document can be used to generate replicate effects wherein at least one hypothetical additional process variable is assumed and one set of the trial responses are substituted as responses for the hypothetical variable at one of two levels. Individual contrasts for the hypothetical variable are calculated, including the interaction contrasts thereof, to generate replicate effects.

Contrast sums are identified that are both greater than the next largest contrast sum by a factor of 2, as well as greater than all replicate effects calculated. Of the identified contrast sums, the significance of the contrasts, or associated effects, can be tested using an end count method.

The raw information from the process is thus transformed into information regarding the "significant effects" of level settings of the process variables. The level settings of the process can be adjusted to impart the "significant effects" to the process, or to avoid them, depending on whether the effects shift the process in the direction of an improvement.

BRIEF DESCRIPTION OF THE DRAWINGS

FIG. 2 is the response matrix for Example #1.

FIG. 3 is the worksheet used to calculate and display individual contrasts as well as contrast sums.

FIG. 4 is the worksheet of FIG. 3 completed for Example #1.

FIG. 8 is the worksheet of FIG. 4 recalculated after the AC interaction has been removed for Example #1.

FIG. 10 is a response matrix for Example #2.

FIG. 11 is a the worksheet of FIG. 3 completed for Example #2.

FIG. 12 shows how the variables in the Yates method table of FIG. 13 are calculated for Example #2.

FIG. 13 is a table showing the results of the Yates method for Example #2.

DETAILED DESCRIPTION OF THE INVENTION

The present invention relates to a method of manufacturing or improving a manufacturing or fabrication process, or a product or article. The various embodiments of the method provide a way of transforming raw information regarding key variables and the impacts thereof on the product/process, into focused estimates of "significant effects" that the input variables have on the key parameters of the process/product. Once the transformation of information takes place, the new information is used to adjust the input variables, resulting in an improved or satisfactory process or product.

Figure 1:
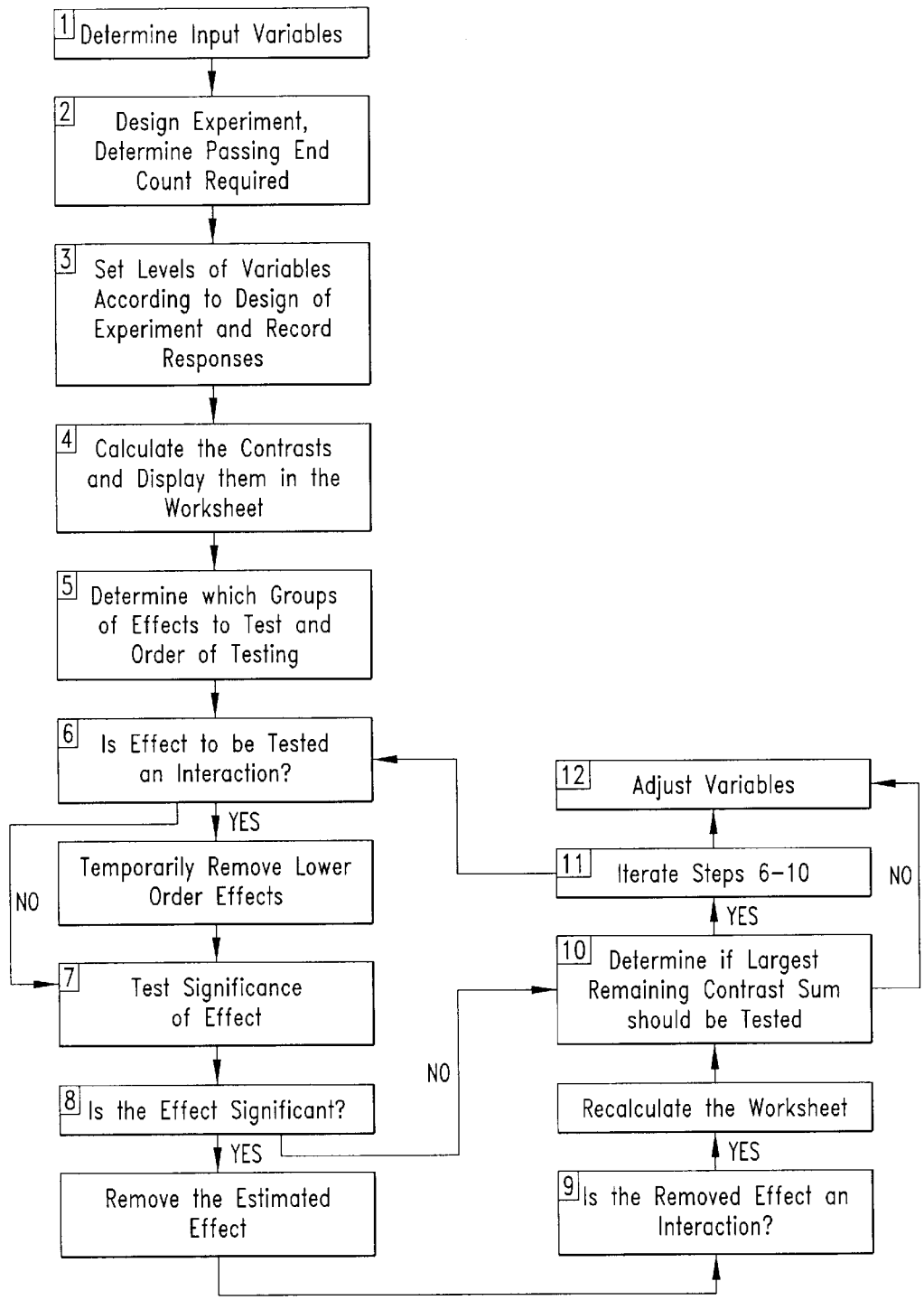
FIG. 1 is a flow sheet showing the steps of an embodiment of the method.

As illustrated in FIG. 1, one embodiment of the method comprises the following steps: 1) determine the input variables of the process that may effect the process or product parameters of interest; 2) complete the design of the experiment and determine the significance required; 3) set levels of the variables in the process according to the design of the experiment and measure the process or product parameter; 4) calculate the estimated effects as individual contrasts and display the effects in a worksheet; 5) determine which group of effects to test for significance as well as the order in which the effects will be tested; 6) if the effect to be tested for significance is an interaction and if the end count method is to be used as a quick gauge test of interaction significance, temporarily remove the estimates of any lower order effects from the responses; 7) test the effect for significance; 8) permanently remove the estimated effect if significant; 9) if the effect removed is an interaction then recalculate the worksheet; 10) determine if the largest remaining contrast sum should be tested for significance; 11) iterate steps 6 through 10 above; 12) use the information transformed to adjust the input variables to impart an improvement in the process/product.

The first embodiment of the method is best illustrated by describing it in conjunction with a simplified example application. This is done in Example #1 below.

EXAMPLE #1

The following first example description is directed toward improving a manufacturing or fabrication process, specifically, improving quality of an article made by the manufacturing process. Improving product quality may typically entail meeting product specifications, exceeding product specifications, or increasing the amount or percent of units of product that meet specifications. The steps of the method recited above are described in detail below and applied to the example.

For Step 1, it is determined that there are 3 manufacturing process input variables that are likely to have effects on product quality. The product quality is measured by an output response, or a product characteristic, with the measurement being a gage of the product quality improvement sought. It may be desired to target a range of values for the product characteristic, or a single value. The product characteristic measured could be, for example, a measured tensile strength of the product or component of the product. Again, the product characteristic can be any parameter identified as important to the product. The input variables, or process variables, are physical or operating conditions of the manufacturing process, process steps, or specifications of parts/materials used in the process such as equipment or raw materials.

In this simplified example, each of the process variables will be tested at only 2 levels, conditions, or settings. For example, if one of the process variables is a temperature parameter, it may be tested at two temperatures, or if it is, for example, a specification on a part used in the process, it may be tested at both extremes of the current specification limit.

Step 2 is to complete the design of the experiment including determining the number of levels at which to test the variables and the structure of experiment (full factorial experiment in the embodiment illustrated herein) and determine the significance required. The experimental structure applied in this illustration is a traditional full factorial. Full factorial experiments, with P number of factors, or input variables, each tested at X number of levels, or settings, will require $X^P$ number of measurements of the output response to complete one full factorial experiment. In this example, there are P=3 process input variables to be tested at X=2 levels, or settings, each. Thus, the output response must be measured $2^3$=8 times per experiment, to complete the full factorial experiment, which results in every combination of factor and level settings being tested once. To acquire the relevant data, on line (operational) changes are made to the process variables of interest during manufacturing. The intent of making the changes is to estimate the impact of the variables on the output response, or product characteristic, and to then make adjustments to the process variables to improve the response, or product quality based on information transformed into "significant effects" information by the method. Data is limited as it is desired to minimize disturbances to the manufacturing process, so that a minimal number of changes can be made to the variables for testing purposes. The data is thus generated according to the pre-designed full factorial experiment structure discussed above to maximize the information yielded by the data. The experiment in Example #1 is run twice to gather 16 output responses as to product characteristic. Thus there will be a first and second set of output responses, or repeat tests or trials, for each combination of level settings.

In accord with a traditional notation used with analysis of full factorial experiments to help simplify tracking and recordation of experimental results, each of the level settings for each process variable is represented by – or +. In addition, the process variables themselves are represented by A, B, or C. For example, A+ corresponds to the first of three process variables, set at the + level.

FIG. 2 is a response matrix and illustrates how the full factorial design of the experiment in Example #1 can be illustrated in matrix form using the notion described above. The response matrix of FIG. 2 is for a $2^3$ full factorial experiment for Example #1. The matrix is configured to reflect the design of the experiment and provide a convenient way to record the output responses (product characteristics). The cells are each labeled in a lower right hand corner ((1), a, b, ab, c, ac, bc, and abc) in accordance with traditional or standard cell notation for ordering combinations, used with factorial experiments. Each cell represents a particular and unique combination of level settings for the process variables in the experiment. This can be seen directly from the structure of the table, and is reflected in the notation for the cell. For instance, the ab cell is positioned in the A+ column, the B+ row, and the C– half of the response matrix. The ab notation indicates that the A and B variables are set at the + level.

The passing end count must also be determined in Step 2. For Example #1, a confidence level of 95% is chosen and this will later be tested by the end count. The end count is a way to verify the statistical significance of the effects calculated from the experimental data. The mechanics of checking end count are discussed in more detail in Step 7.

Step 3 requires changing the process variables in accord with the design of the experiment. During the experimentation in Example #1, the process variables, or input variables, are each set according to the design of experiment reflected in FIG. 2. For the first cell in the upper left hand corner of the response matrix of FIG. 2, labeled "(1)", all of the process variables are set to the – level since (1) does not correspond to any of the letters of the input variables. The tester measures the resulting product characteristic, and records the result in cell (1). This process is repeated for each of the cells. For example, for the last cell, labeled "abc" in the lower left corner of the table, all three of the process variables are set to the + level. The settings of the variables are represented by A+, B+, and C+. When all of the cells have been filled with the appropriate output response, or product characteristic measurement, a full factorial experiment has been conducted. Pairs, or repeat tests, or trials, are conducted for each combination of level settings of the process variables, and the corresponding responses are recorded in pairs in the cells of FIG. 2. The product characteristic measured for each combination of level settings for the process variables for Example #1 are displayed in FIG. 2.

Step 4 is to calculate individual contrasts for each of the changes between levels in the variables, and effects of the variables on the product characteristic. This can be done in the form of the worksheet shown in FIG. 3.

The three leftmost columns of the worksheet are labeled "2-Factors, "3-Factors," and "4-Factors." Each of the cells in those columns are labeled to correspond to cells of a related response matrix. In the 3-Factor column, the cells are labeled with standard notation to represent the cells of a 3-factor response matrix, such as in Example #1. The fourth column from the left in the worksheet, labeled "Y", is for recording the output response of the process, in this case, the measurement of product characteristic. For Example #1, the product characteristic measurements for each cell of the response matrix of FIG. 1 are recorded in the "Y" column in the order indicated by the cell notation under the "3-Factors" column.

The remaining cells of the worksheet display contrasts. The contrasts are estimates of the effects of changes in the level settings of factors, or process variables A, B, and C in Example #1. The contrasts have an equal number of + and − signs and are combinations of the responses, or product characteristics. Each of the columns displays contrasts for a particular factor or combinations of factors, as indicated at the top of each column by the factors, or process variables shown. For example, the first column is labeled the "A" column to indicate that the column only displays single factor contrasts for variable A. Single factor contrasts are displayed for each factor in the worksheet, and estimate an effect of a change in the level of the factor with the other factors are set at either the − or + level during the change. Two factor interaction contrasts are also displayed that estimate the effect of changes of a factor on the effect of changes of another factor. Three factor interaction contrasts are also displayed that provide estimates of the effect of changes of a factor on a two factor interaction.

Figure 3:
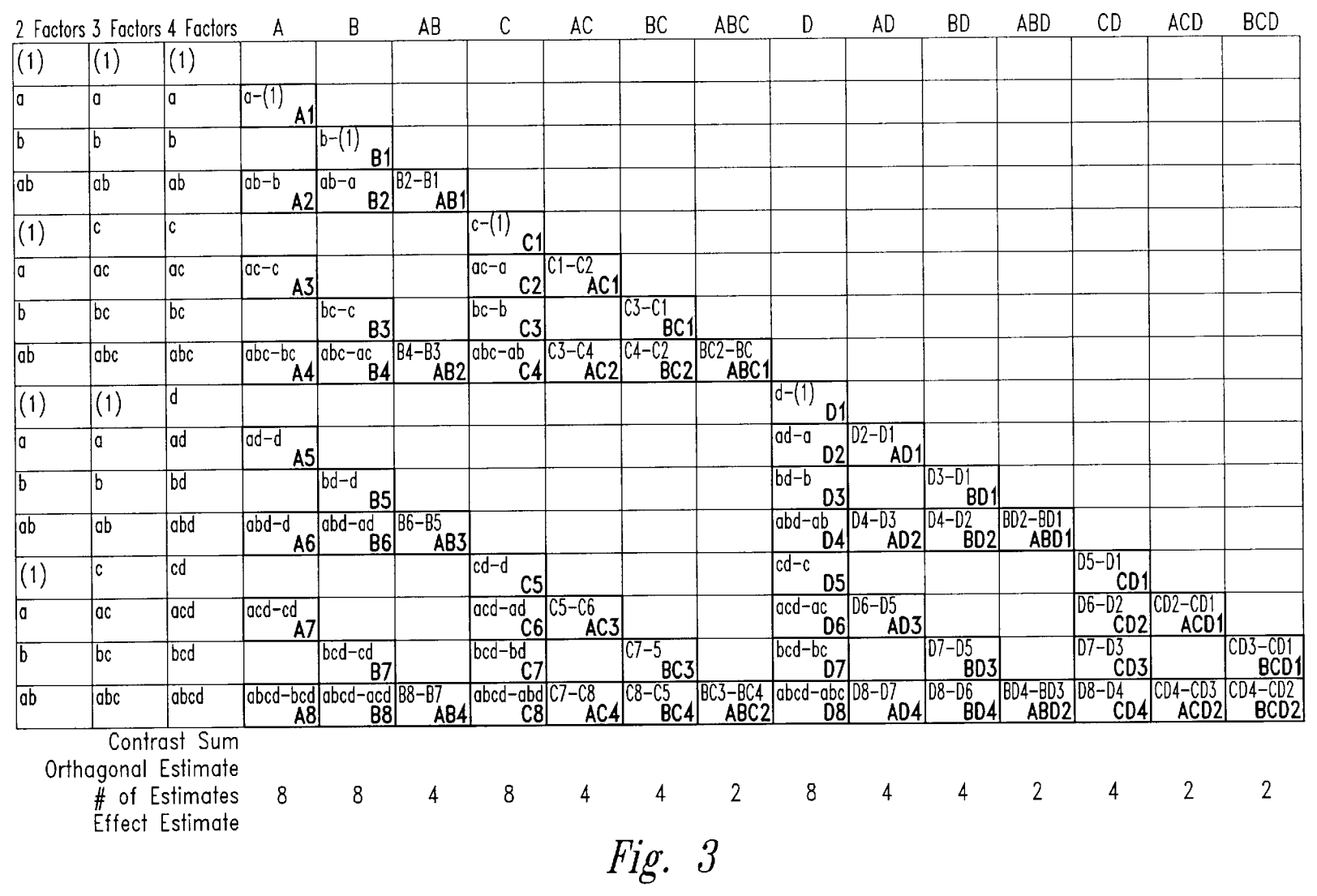

To better illustrate the physical meaning of contrasts, note that the contrast in cell B1, in the upper left corner of FIG. 3, is represented by the notation b-(1), as indicated in the cell. This is equivalent to the difference between the output response (product characteristic) with B set to the +, and the output response with B set to the − level, while the other factors are set at the − level. In addition, cell B2 in the worksheet, positioned just below cell B1, is represented by the notation ab-a, which is equivalent to the difference between the output response with B set at the +, and the output response with B set at the − level, with A at the + level and C at the − level. To illustrate the physical meaning of an interaction, or contrast involving two factors, note that cell AB1 of the worksheet of FIG. 2 provides an estimate of the effect of a change in the level of A, on the estimated effects of changes in the level of B discussed above. Hence, cell AB1 is represented by B2−B1 which is equivalent to the difference between cell B2 and cell B1 of the worksheet. Each of the cells of the worksheet are calculated in this manner according to the notations in the worksheet cells. Contrasts are displayed for each single factor change, as well as for each interaction, including higher order interactions involving 3 factors.

The worksheet in FIG. 3 is directed toward an experiment with 16 total output response data points and only 2 to 4 factorial experiments. However, the worksheet can be expanded as needed.

The four rows at the bottom of the worksheet display: 1) the sum of contrasts for cells in that column (Contrast Sum); 2) the orthogonal estimate, or contrast sum divided by half the number of output responses; 3) the number of individual effects, or contrasts, in the column (# of Estimates); and 4) the "effect estimate," which is the average estimated effect, or contrast for the column.

Figure 4:
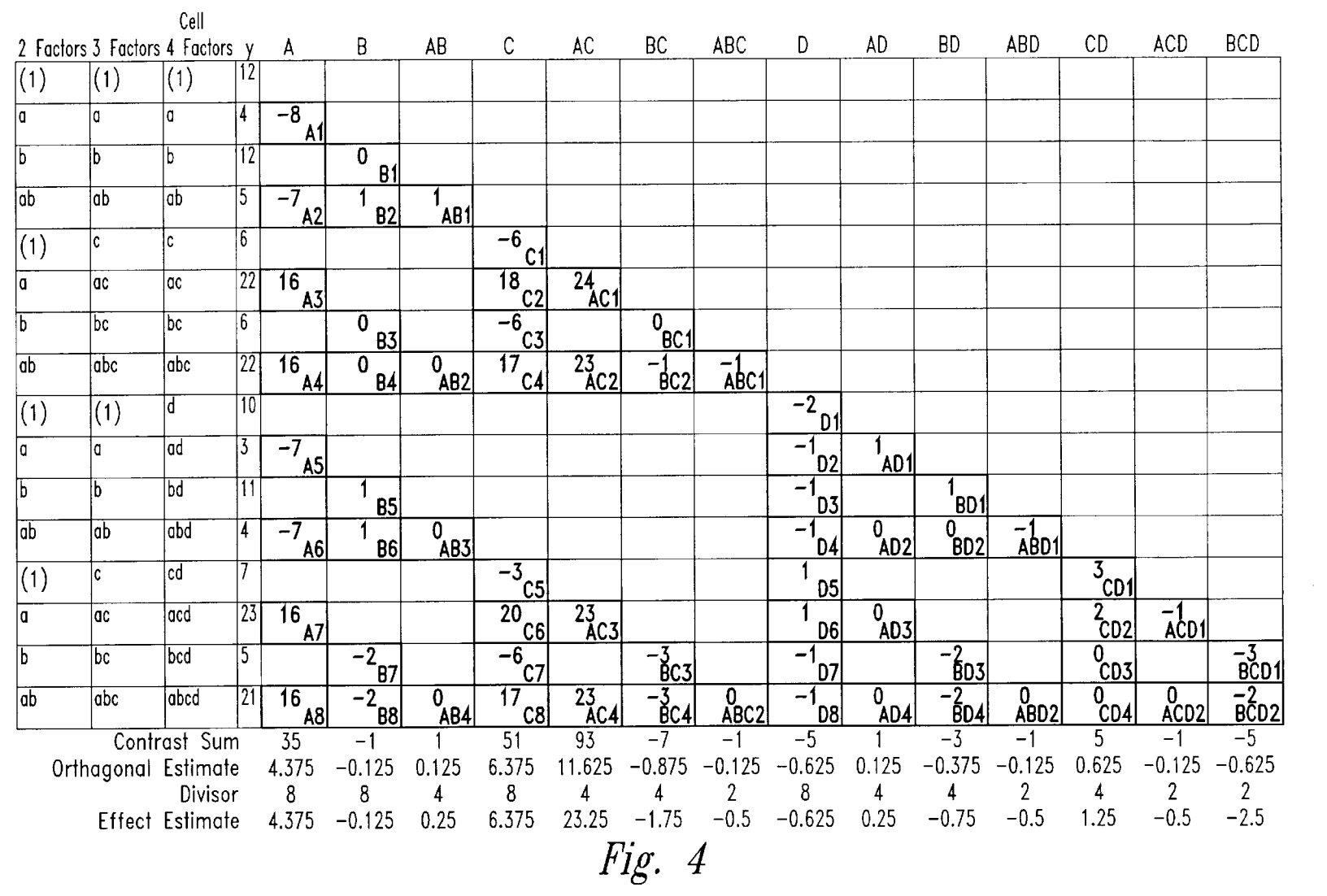

FIG. 4 shows the worksheet completed for Example #1, using the measured product characteristics from the response matrix in FIG. 2. Note that since there are only 3 process variables, the columns for contrasts involving changes in a D variable do not have physical meaning except for measuring "noise" or variation not associated with the effects being estimated. The contrasts calculated in those columns are called replicate effects. D is treated as a hypothetical process variable, and the "noise" contrasts, or replicates effects, involving changes in the level of D are calculated by substituting the second of the repeat set of output responses, which begins with 10 under the "Y" column of the worksheet, for the hypothetical responses that would be generated by the D variable at the + level. This is illustrated for Example #1 by the D1 cell of the Worksheet, which is notated in FIG. 3 as d−(1). That cell is calculated as (1)−(1), wherein pairs of responses (product characteristic measurement), recorded in cell (1) of the response matrix for the repeat tests, are subtracted from one another to reveal a measurement of variation not attributable to the effects being tests.

For Example #1, as can be seen in FIGS. 3 and 4, there is a first set, or column, of intra-cell replicate effects under column "D," that measures variation between the repeat tests, or the variation between output responses within the cells of the response matrix of FIG. 1. In addition, there are second set replicate effect, columns "AD," "BD," and "CD," that measure variation between the intra-cell replicate effects, the set being represented by interactions between the hypothetical D process variable and each of the A, B, and C process variables. Lastly, there are third sets of replicate effects that measure variation between the inter-cell replicate effects, represented by hypothetical interactions between D and two of the other three variables. For Example #1, FIG. 4 shows all of the cells in the D columns calculated. All of those numbers represent variation not attributable to the effects being tested and are replicate effects. Again, if a process variable D was being tested, these cells would be individual contrasts and not replicate effects.

The variation in contrast sums as well as in contrasts is inspected in the worksheet. A large variation in contrasts within a particular column of the worksheet can be an indicator of an interaction. In FIG. 4 for Example #1, under column A, the range of estimated effects, or contrasts, for level changes in the process variable A vary from between −8 to 16. This is indicative of an interaction between A and another variable. By cross referencing, or comparing, the contrasts in FIG. 4 to the notations in the worksheet of FIG. 3, it can be seen that the interactions are between the A and B process variables. For example, in cells A1 and A2, in FIG. 4, the estimated effect on the product characteristic is −8 and −7, whereas for cells A3 and A4, the estimated effects are 16 and 16. In FIG. 4 it can be seen from the contrast notations for cells A1 and A2, a−(1) and ab-b, that the C variable is set at the − level for both contrasts. However, for cells A3 and A4, the contrast notations indicate that the C process variable is set at the + level. This is indicative that C should be set at the + level while the setting of A is forced from the minus to the plus level.

Figure 5:
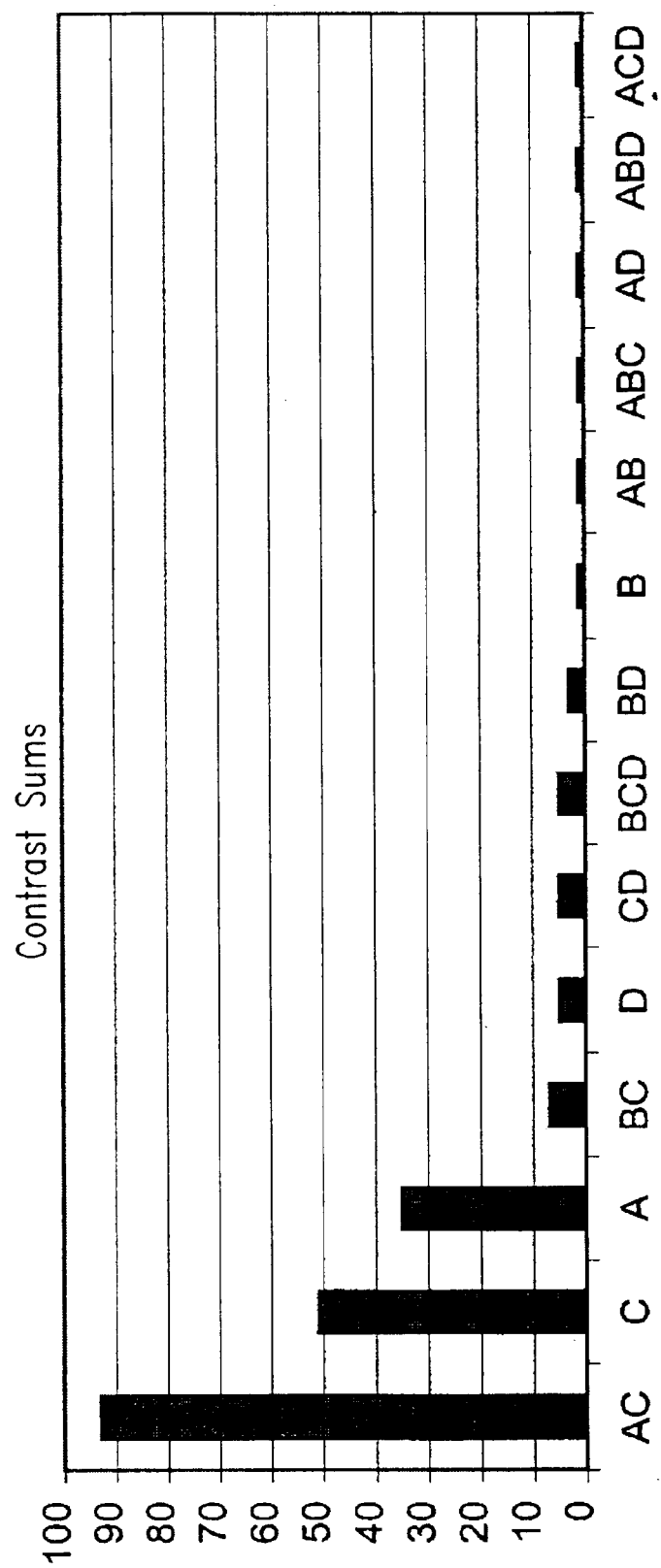
FIG. 5 is a Pareto chart of the contrast sums calculated in FIG. 4.

Step 5 is to identify or determine which estimated effects of the process variables should be tested for significance. The sum of contrasts displayed for Example #1 in FIG. 4 are plotted on a Pareto Chart in FIG. 5 to assist in deciding which estimated effects to test, and which to exclude. Adjacent contrast sums that drop by about a factor of two or more on the Pareto Chart are noted. Contrast sums on the high side of the drop are identified and tested for significance. Those on the low side of the drop may be excluded. Furthermore, for 2 and 3 factor experiments, the contrast sums of the replicate effects are compared with the contrast sums determined to be on the high side of the drop. If the replicate effects are approximately equal to the contrast sums identified, those identified contrast sums may be excluded from testing, since the background noise would appear to be as large as the effects.

As seen in FIG. 4, for Example #1, the first drop off, or break, of about a factor of 2, is between the A contrast sum and the BC contrast sum. Thus the AC, C, and A contrasts will be tested for significance. In addition, the highest order contrasts are tested first. AC is the highest order in Example #1 and should thus be tested for significance first.

Step 6 requires that before an interaction effect is tested for significance, the estimates of all lower order effects involved in the interaction are temporarily removed from the response matrix to isolate the effect of the interaction. For Example #1, the effects of process variables A and C must be removed to test for the significance of the contrasts for the AC interaction. When removing lower order effects, such as those of process variables A and C, the orthogonal estimates, calculated and displayed at the bottom of the worksheet in FIG. 4, are used. The orthogonal effects are removed by subtracting the orthogonal estimate from product characteristics (output responses) that correspond to the + level settings for the process variables A and B. This is illustrated in Table 1 below. The Y column of Table 1 displays the product characteristic measurements that correspond to the indicated cell of the response matrix of FIG. 2. The orthogonal estimates for process variables A and C are 4.375 and 6.375, as shown in FIG. 4 for Example #1. These are subtracted from the product characteristic measurements as shown in Table 1, and as explained above, to arrive at the results in the last column, which shows the product characteristics with the orthogonal estimates removed.

TABLE 1

SUBTRACTING ORTHOGONAL ESTIMATES FOR A AND B FROM THE PRODUCT CHARACTERISTIC Y.

| Cell | Y | A | Orth. Est. for A | C | Orth. Est. for B | Y with Orthogonal Estimates Removed |
|---|---|---|---|---|---|---|
| (1) | 12 | − | | − | | 12 |
| a | 4 | + | 4.38 | − | | −0.38 |
| b | 12 | − | | − | | 12 |
| ab | 5 | + | 4.38 | − | | 0.62 |
| c | 6 | − | | + | 6.38 | −0.38 |
| ac | 22 | + | 4.38 | + | 6.38 | 11.24 |
| bc | 6 | − | | + | 6.38 | −0.38 |
| abc | 22 | + | 4.38 | + | 6.38 | 11.24 |
| (1) | 10 | − | | − | | 10 |
| a | 3 | + | 4.38 | − | | −1.38 |
| b | 11 | − | | − | | 11 |
| ab | 4 | + | 4.38 | − | | −0.38 |
| c | 7 | − | | + | 6.38 | 0.62 |
| ac | 23 | + | 4.38 | + | 6.38 | 12.24 |
| bc | 5 | − | | + | 6.38 | −1.38 |
| abc | 21 | + | 4.38 | + | 6.38 | 10.24 |

Step 7 is to test the estimated effect for significance, in this case, the interaction effect. The method used is an end count. To do this, the responses, or product characteristic measurements, are sorted in rank order (ascending order) and all associated cells in the Table 1 that are in the same row as the sorted response cell, are also shifted with the associated response cell. This is shown in Table 2 below. Table 2 has one more column than Table 1. The additional column is the rightmost column in the Table 2 and displays the product of the level settings for process variables A and C. AC is thus only positive when either both process variables A and C are positive, or both are negative. The significance of this is that it is indicative of whether the levels of the variables are set to permit an interaction. The separation between + and − signs in the AC column in Table 2 is indicative of the amount of overlap between the responses with potential AC interaction and those without potential AC interaction. As such, an end count is used to quickly gage the significance of the AC interaction. The end count is done by first counting − signs from the top of the AC column until a + sign is encountered. Next, + signs are counted starting from the bottom of the column until a − sign is encountered. The two counts are added together to get an end count. Table 2 shows that the end count for AC for Example #1 is 16. Table 3 shows that an end count of 10 is required for a confidence level of 95%. The AC interaction is thus identified as significant.

TABLE 2

TABLE 1 SORTED IN RESPONSE RANK ORDER

| Cell | Y | A | Orth. Est. for A | C | Orth. Est. for C | Y with Orthogonal Estimates Removed | AC |
|---|---|---|---|---|---|---|---|
| a | 3 | + | 4.38 | − | | −1.38 | − |
| bc | 5 | − | | + | 6.38 | −1.38 | − |
| a | 4 | + | 4.38 | − | | −0.38 | − |
| c | 6 | − | | + | 6.38 | −0.38 | − |
| bc | 6 | − | | + | 6.38 | −0.38 | − |
| ab | 4 | + | 4.38 | − | | −0.38 | − |
| ab | 5 | + | 4.38 | − | | 0.62 | − |
| c | 7 | − | | + | 6.38 | 0.62 | − |
| (1) | 10 | − | | − | | 10 | + |
| abc | 21 | + | 4.38 | + | 6.38 | 10.24 | + |
| b | 11 | − | | − | | 11 | + |
| ac | 22 | + | 4.38 | + | 6.38 | 11.24 | + |
| abc | 22 | + | 4.38 | + | 6.38 | 11.24 | + |
| (1) | 12 | − | | − | | 12 | + |
| b | 12 | − | | − | | 12 | + |
| ac | 23 | + | 4.38 | + | 6.38 | 12.24 | + |

EC = 16

TABLE 3

REQUIRED ENDCOUNT

| | Required Endcount given the confidence listed below: | | | |
|---|---|---|---|---|
| # Factors | 90% | 95% | 99% | 99.9% |
| 2 | 8 | 9 | 11 | 14 |
| 3 | 9 | 10 | 12 | 16 |
| 4 | 10 | 11 | 13 | 16 |

Step 8 is to permanently removed the estimated effect if significant. The estimated effect of the interaction of AC must be removed to test for significance of the remaining identified effects, process variables A and C. The original product characteristic measurements are used for this, from the response matrix in FIG. 2, that is, the lower order effects that were removed earlier must be replaced.

Figure 6:
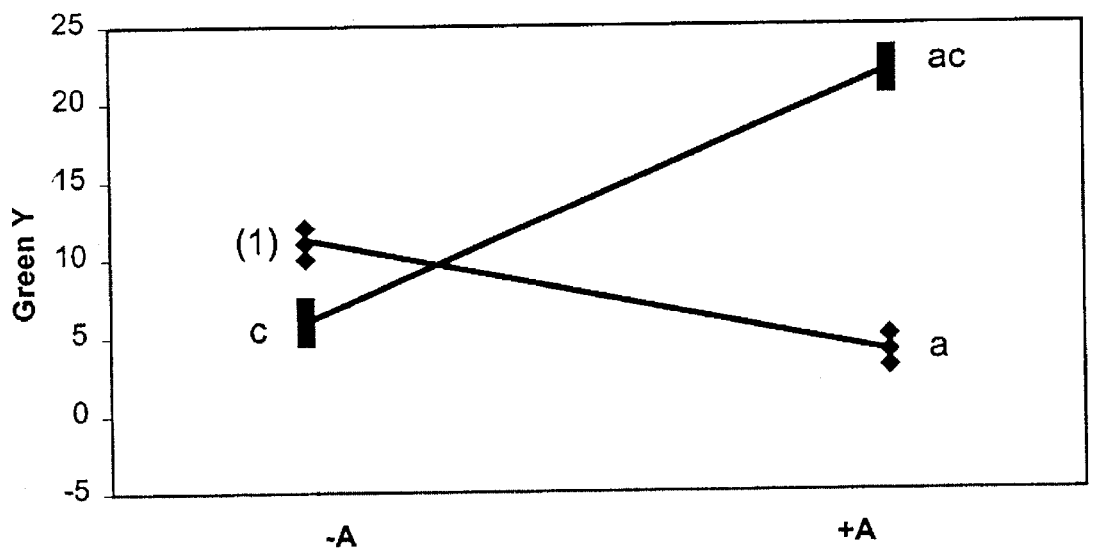
FIG. 6 is a graph of the responses of cells (1), a, c, and ac of the response matrix of FIG. 2, for Example #1.

The estimated effects of −AC can be mathematically removed by directly subtracting or adding it to any cells in the ac matrix. However, the estimate should be removed to achieve the smallest remaining estimates for the lower order effects. For Example #1, a graph is created to aid in removing the estimate of the AC interaction to achieve the smallest remaining estimates. This graph is illustrated in FIG. 6. The graph indicates that removing the AC interaction effect from cell ac will leave the smallest A and C effects.

FIG. 6 shows that there is not a perfect spike interaction between the A and C process variables in Example #1. A perfect spike interaction would have an estimated effect close to zero at one of the levels of A and a large estimate at the other level of A. In this case, the C effect is −5 at the A− level and 20 at the A+ level.

Figure 7:
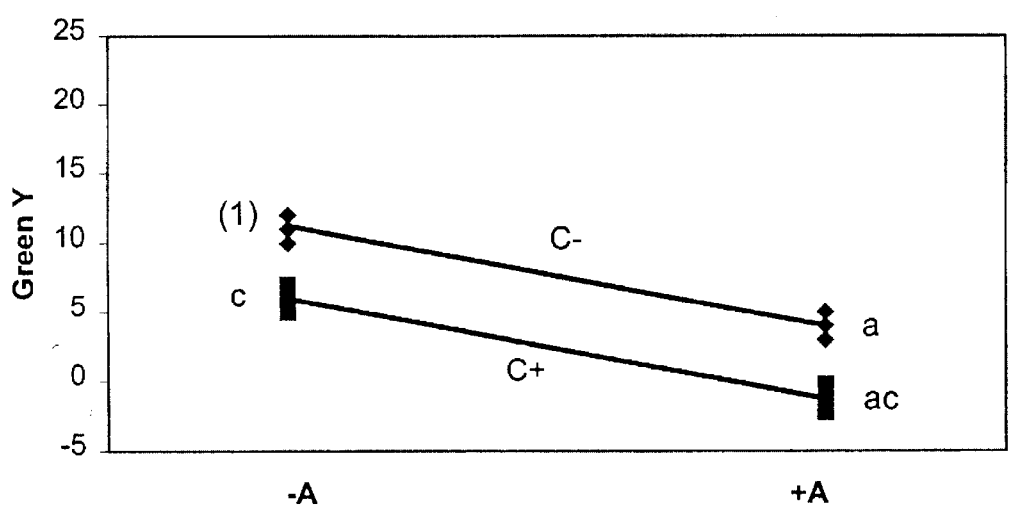
FIG. 7 is the graph of FIG. 6 with the AC interaction effect removed from the ac response.

FIG. 7 is the graph of FIG. 6 with the estimated effect for AC removed from the ac response. By doing so, the unequal sensitivity of the A factor when C is set at the + level rather than the − level, has been set to one of two levels. Now when the effect of A is estimated, it is estimated when C is set at the − level. Also, when the effect of C is estimated, it is done with A set to the − level.

Factors involved in a removed interaction are set to either the + or − level. Examples of the possible settings are summarized in Table 4 below.

TABLE 4

MAIN EFFECT SETTINGS IN THE MATRIX AFTER AN INTERACTION HAS BEEN REMOVED

| Remove AC average effect estimate from: | A effect is estimated with C set to: | C effect is estimated with A set to: |
|---|---|---|
| (1) | C+ | A+ |
| a | C+ | A− |
| c | C− | A+ |
| ac | C− | A− |

TABLE 5

RESPONSE TABLE FOR Y WITH THE ESTIMATE OF AC REMOVED FROM CELL AC (AND ABC)

| Cell | Original Y | Estimate of AC | Y without the estimate of AC |
|---|---|---|---|
| −1 | 12 | | 12 |
| a | 4 | | 4 |
| b | 12 | | 12 |
| ab | 5 | | 5 |
| c | 6 | | 6 |
| ac | 22 | 23.25 | −1.25 |
| bc | 6 | | 6 |
| abc | 22 | 23.25 | −1.25 |
| −1 | 10 | | 10 |
| a | 3 | | 3 |
| b | 11 | | 11 |
| ab | 4 | | 4 |
| c | 7 | | 7 |
| ac | 23 | 23.25 | −0.25 |
| bc | 5 | | 5 |
| abc | 21 | 23.25 | −2.25 |

For Example #1, the AC interaction effect is now removed from the responses using the average estimated effect (not the orthogonal estimate), as shown in Table 5 above.

Step 9 is to recalculate the worksheet if the effect removed is an interaction. Because the last estimate removed was for an interaction between process variables A and C, the worksheet is recalculated before proceeding to Step 11.

Figure 8:
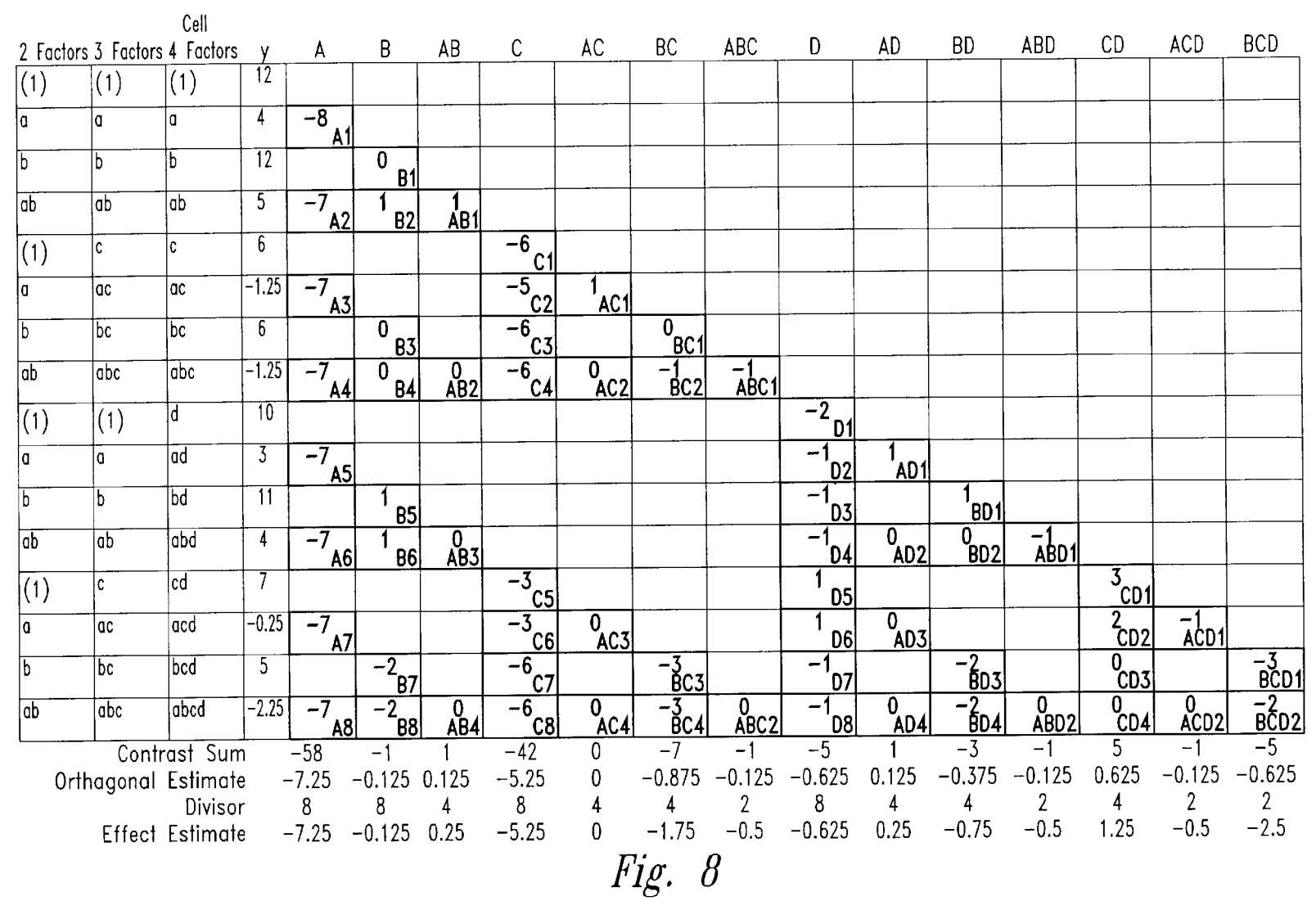

When the removed estimate is a main effect, the worksheet is not recalculated. FIG. 8 is the worksheet, recalculated with the AC estimated effects removed from the product characteristics measurements of the ac and abc cells of the response matrix of FIG. 1.

Figure 9:
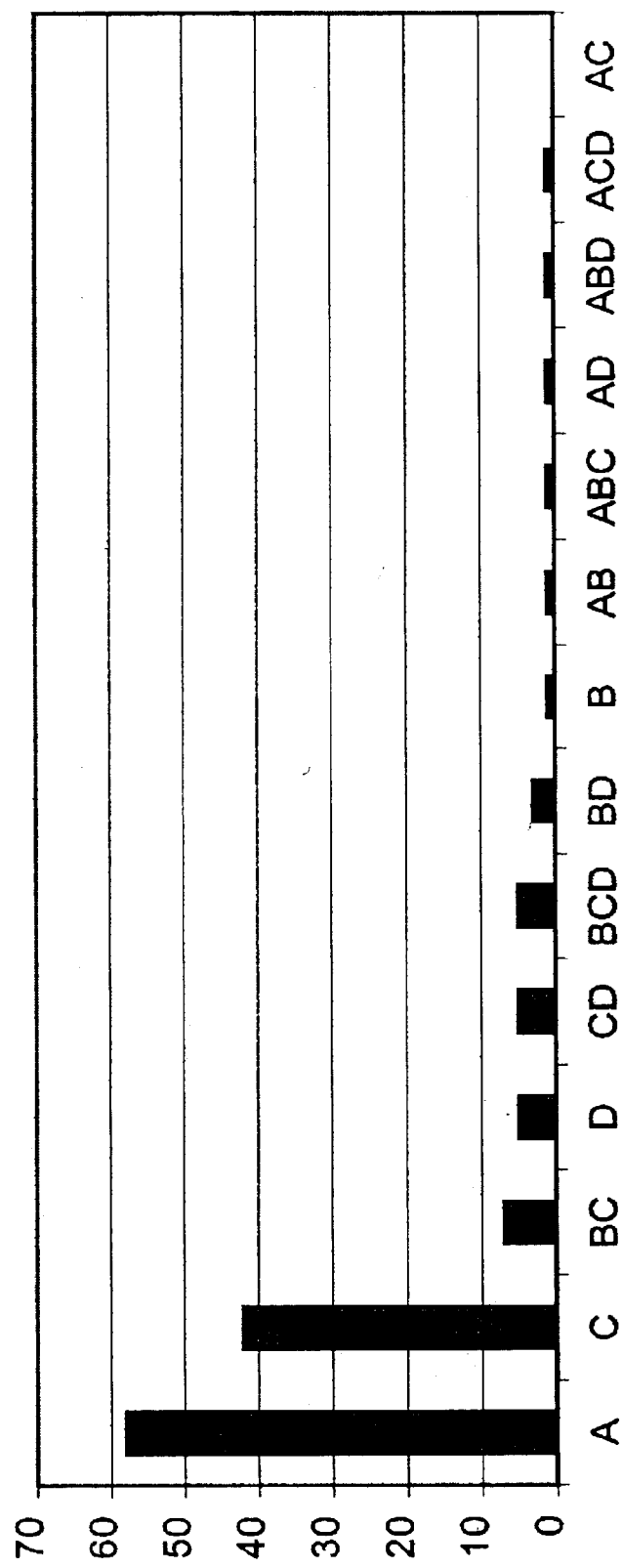
FIG. 9 is a Pareto chart showing the contrast sums of FIG. 8.

Step 10 is to determine if the largest remaining contrast sum should be tested for significance. The contrast sums from FIG. 8 are again plotted on a Pareto Chart as shown in FIG. 9, and again checked for an adjacent drop between contrast sums by a factor of 2 or more, as was previously done before the AC interaction was removed. The contrast sums on the high side represent effects that should be identified and tested for significance. At this point it is noted that if enough leverage has been identified to control the product characteristic, the analysis may be discontinued. Also, if the factor to be checked for significance is a component of an interaction where the effect of the interaction will determine the setting of the factor to be checked, then the analysis may be discontinued, since no degrees of freedom for the variable remains. For Example #1, analysis may be discontinued since the remaining variables that appear on the high side of the break on the Pareto Chart in FIG. 9 are variables in the interaction AC. Assuming enough leverage has been identified with the interaction, then the results of this experiment may cause A and C to be both set at minus levels if it were desired to keep the process characteristic low. Nonetheless, for purposes of illustration, the analysis will continue.

Table 5 is reorganized in rank order response, shown in Table 6. This is done in the same manner as was previously done when the lower order effects of the A and C variable were removed, in Table 2.

TABLE 6

TABLE 5 IN RANK ORDER, SHOWING A SETTING LEVELS

| Cell | Y w/o the Estimate of AC | A Level |
|---|---|---|
| abc | −2.25 | + |
| ac | −1.25 | + |
| abc | −1.25 | + |
| ac | −0.25 | + |
| a | 3 | + |
| a | 4 | + |
| ab | 4 | + |
| ab | 5 | + |
| bc | 5 | − |
| c | 6 | − |
| bc | 6 | − |
| c | 7 | − |
| −1 | 10 | − |
| b | 11 | − |
| −1 | 12 | − |
| b | 12 | − |

EC = 16

The end count is taken using Table 6. The end count is 16 since there is no overlap between the + and − signs of the A level column. This exceeds a required endcount of 10. A is thus found to be significant with 95% confidence.

The A process variable effect is then permanently removed by subtracting the orthogonal estimates from the responses in FIG. 7. This is shown in Table 7 below.

Step 11 is to begin again at step 6. However, the worksheet does not need to be recalculated at this stage because the effect of the A process variable is a main effect and has been removed from the array orthogonally. This means that C effect is still the third largest contrast sum (−42) and should be the next one checked for significance. The endcount check for C is shown in Table 7 and Table 8 below.

TABLE 7

REMOVE THE EFFECT OF A TO CHECK END COUNT FOR C:

| Cell | Y w/o AC effect | A | Effect of A | Y w/o AC effect or A effc |
|------|-----------------|---|-------------|---------------------------|
| −1   | 12              | − |             | 12                        |
| a    | 4               | + | −7.25       | 11.25                     |
| b    | 12              | − |             | 12                        |
| ab   | 5               | + | −7.25       | 12.25                     |
| c    | 6               | − |             | 6                         |
| ac   | −1.25           | + | −7.25       | 6                         |
| bc   | 6               | − |             | 6                         |
| abc  | −1.25           | + | −7.25       | 6                         |
| −1   | 10              | − |             | 10                        |
| A    | 3               | + | −7.25       | 10.25                     |
| B    | 11              | − |             | 11                        |
| Ab   | 4               | + | −7.25       | 11.25                     |
| C    | 7               | − |             | 7                         |
| Ac   | −0.25           | + | −7.25       | 7                         |
| Bc   | 5               | − |             | 5                         |
| Abc  | −2.25           | + | −7.25       | 5                         |

TABLE 8

TABLE 7 SORTED IN RANK ORDER WITH THE C LEVEL ADDED:

| Cell | Y w/o AC and A Effects | C Level |
|------|------------------------|---------|
| bc   | 5                      | +       |
| abc  | 5                      | +       |
| c    | 6                      | +       |
| ac   | 6                      | +       |
| bc   | 6                      | +       |
| abc  | 6                      | +       |
| c    | 7                      | +       |
| ac   | 7                      | +       |
| −1   | 10                     | −       |
| a    | 10.25                  | −       |
| b    | 11                     | −       |
| a    | 11.25                  | −       |
| ab   | 11.25                  | −       |
| −1   | 12                     | −       |
| b    | 12                     | −       |
| ab   | 12.25                  | −       |

EC = 16

The endcount of 16 exceeds the required endcount of 10. C has been found to be significant with 95% confidence.

The new and transformed information yielded is that the largest effect is AC with an estimated effect of 23.25. Setting both process variables A and C to the + levels causes an increase of about 23 in the product characteristic. Furthermore, when process variable C is set to the − level, the A effect is significant with an estimated effect of −7.25. Also, when the process variable A is set to the minus level the C effect is significant with an estimated effect of −5.25. Thus, in order to maximize the product characteristic, or output response, both A and C must be set to their plus levels. To minimize the product characteristic, either and or both A and C should be set at the minus level.

Step 12 is to use the information that has been transformed from process data into information that can be used to directly control the process, to improve the product/article of manufacture, by setting the variables as a function of the "significant effects." It should be determined whether any of the significant effects, estimated by the contrasts, will impart a shift in the product characteristic in the direction desired, or whether the effect is to be avoided. Also, it is noted that the desired product characteristic may be a range of values. If the estimated effects are indicative of level settings of the process variables that will improve the process as whole, taking into consideration costs and other factors associated with maintaining the level settings, then the factors may be set at the appropriate level settings to impart the estimated effects. For Example #1, if the product characteristic is, for example, percent impurity of some component, and it is desired to derive a more pure product, both A and C will be set at minus levels if not cost prohibitive. In that way, even if one variable goes out of control, the other variable may remain at the minus level, preventing the interaction effect from occurring between the variables, causing a high level of impurity. On the other hand, if the product characteristic is, for example, tensile strength, and it is desired to have a strong product with high tensile strength, both A and C may be set at their plus levels if it is not cost prohibitive.

EXAMPLE #2

Example #2 compares an embodiment of the method to the Yates analysis. Example #2 is also directed toward improvement of a fabrication process where a spike interaction is present between variables. Example #2, like Example #1, is an alternative embodiment of the method and is also merely one example application of the method.

In Example #2, for Step1, two input variables are selected for testing at 2 levels each. Again, a product characteristic is the measured response or output.

Step 2 is to design the experiment using a factorial design. In Example #2, there are 2 factors in the experiment with 2 levels each. A $2^2$ response matrix is thus required. Each combination of level settings for the variables is to be tested four times, to produce four repeat responses in each cell of the response matrix.

A passing end count is determined in accordance with Step 3 depending on the confidence required.

Step 4 is to set the levels of the variables and record the responses to complete the full factorial experiment with four repeat runs. The results of the experiment are shown in FIG. 10.

Example #2 is a simplified example and FIG. 10 of the example shows that an interaction is occurring between process variables A and B, since the responses in the ab cell are larger than the responses in the other cells.

Figure 11:
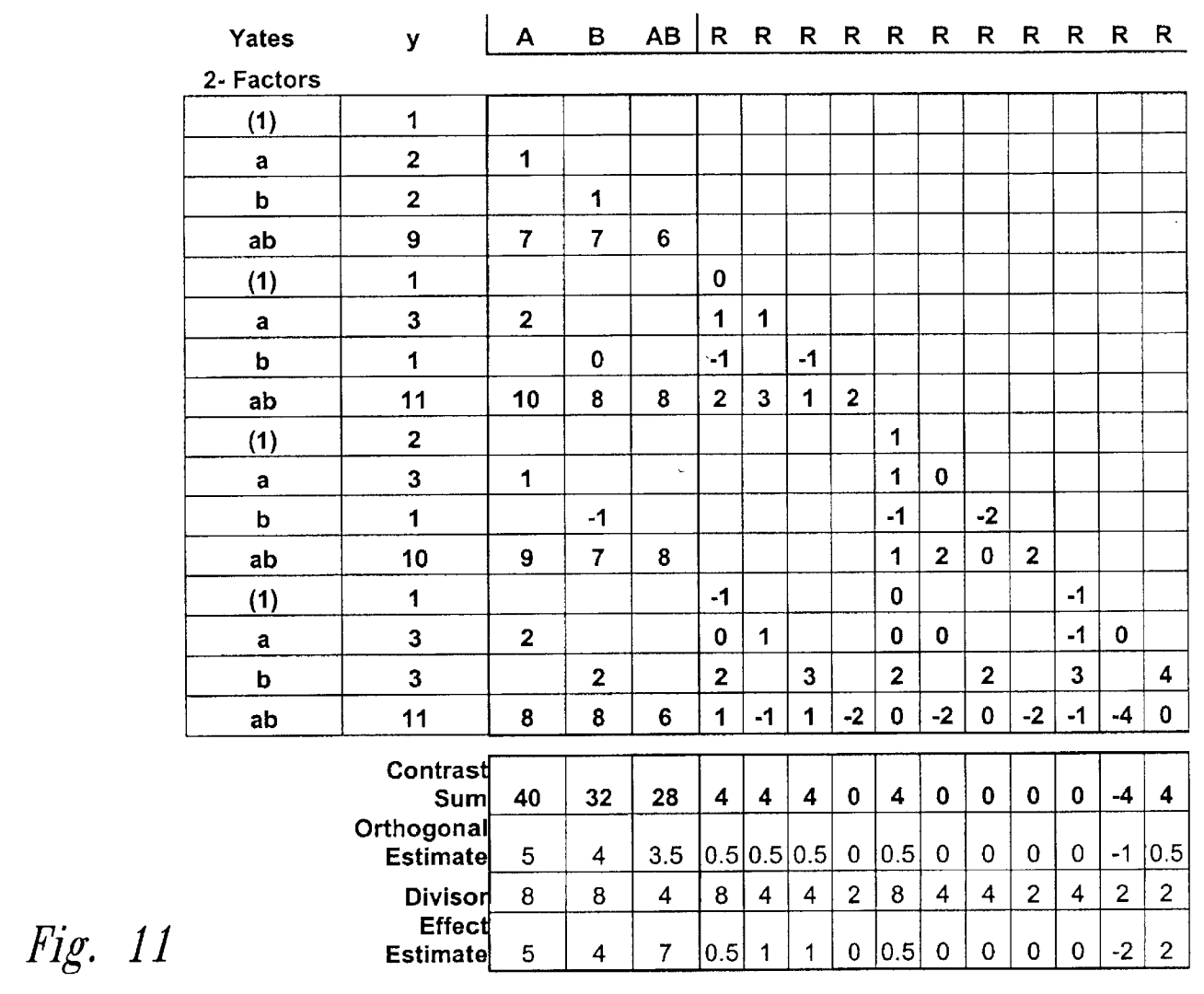

Step 5 is to calculate the estimated effects as individual contrasts and display the effects in the worksheet. This is shown in FIG. 11. Evaluating the contrasts in the worksheet reveals that there is an interaction between A and B when both variable are set at + levels. First, the set of individual contrasts shown in the worksheet for A range from 1 to 10. The set of contrasts for B range from −1 to 7. Finally, the set of contrasts for the interaction between A and B is 6 to 8. The range of contrasts in the A and B process variables combined with steady AB contrasts of limited variance is one indication of an AB interaction effect. This can be verified by examining the leftmost column of the worksheet in FIG. 11 for the particular row in which each contrast is displayed, which provides a notation for the row that indicates the level setting of variables not involved in the particular contrast. This is best seen in the worksheet for Example #2 in FIG. 11, showing that the value of each contrast for process variable A is at the high end of the range in each "ab" row, the "ab" notation indicating that B is set at the + level. Furthermore, each value for the contrasts for process variable A is at a low end of the range in each "a" row, the "a" notation indicating that B is at the − level. The AB interaction can be verified by examining the B level settings in the same manner.

An interaction can thus be predicted based only on the worksheet, and the level settings of process variables A and B may be set to impart the AB interaction effect to the response, or to avoid it, depending on the target value of the response.

An application of the well known Yates analysis to Example #2 is shown in FIGS. 12 and 13. The column labeled "Effects" in these figures show the calculated effects for A, B, and the AB interaction, in that order from the top of the column. The A effect and B effect are calculated to be 5 and 4, with the AB effect calculated to be only 3.5. As can be seen in this simple example in FIG. 9, it is clear that the response for AB is the largest with all other responses approximately equivalent. It is thus clear that the Yates method is yielding the wrong result and the A effect is not the largest effect.

EXAMPLE #3

Example #3 provides further explanation of an embodiment of the method as applied to a spike interaction. Example #3 is again directed toward improvement of a manufacturing process, having process variable A, and B, with two level settings, and a measurable response indicative of improvement to the process.

As has been shown in the description of the embodiment of the method in Example #2, a method is provided to analyze full factorial experiments to identify and quantify spike interactions. Spike interactions can be explained by viewing a 2^2 experimental matrix plotted as a plane.

Figure 15:
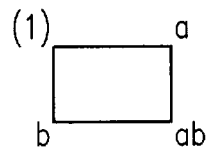
FIG. 15 is a representation of the "plane" discussed in Example #3.

To explain a spike interaction it is helpful to picture a plane created in space having 4 corners, as illustrated in FIG. 15. For Example #3, the x, y component of each corner are determined by the settings of process variables A, B. The z component of each corner is set by the measurable response, which is equivalent to the height of each corner of the plane.

Figure 16:
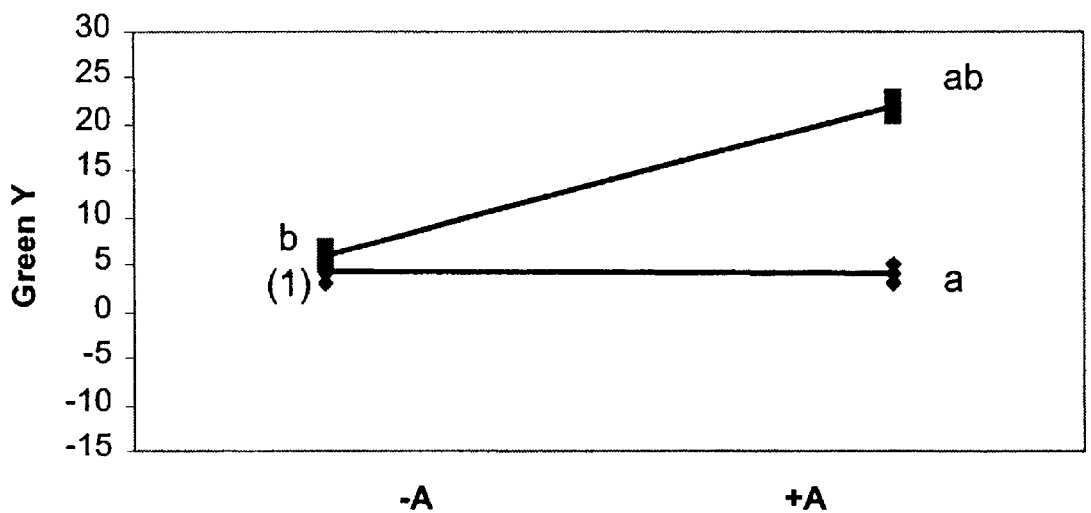
FIG. 16 is a graph of the responses discussed in Example #3.

If the responses of all cells are approximately equal and are, for example, 2 units, the plane will float 2 units above the zero plane and will be parallel to the zero plane. For Example #3, there is an A main effect of 0 units, so corners (1) and a will be the same, in this case 4 units off the zero plane. There is also a B main effect of 2 units, so corner b will be 2 units higher than corner (1). If there is no interaction corner ab will be equal to corner (1) plus both the A and B effects. In this case that would yield a corner ab at 6 (4+0+2). If there is no interaction the main effects are superimposed upon each other, and the plane remains flat, but no longer parallel to the zero plane. However, for Example #3, there is a spike interaction. This is shown in FIG. 16, wherein the response of the ab cell is 22. Thus, A and B are interacting, at one level, to display a higher response than simply superimposing the A and B effects. The responses are (1)=4, a=4, b=6, and ab=22.

Interactions impart a twist on the plane. Traditional interactions cause opposite cells to move as a pair. For example a traditional AB interaction will cause cells (1) and ab to both move in the same direction. Traditional interactions cause the plane to look like a saddle. Main effects superimposed over traditional interactions will cause the plane to look like a tilted saddle. The Yates analysis is based on the analysis of traditional interactions.

Field experience has proven the existence of spike interactions. Spike interactions do not effect the response plane in the same manner as traditional interactions. Spike interactions cause one cell of the matrix (not two) to move independent of the other cells. For example, a positive ab spike interaction will cause the ab corner of the plane to "spike up" making it significantly higher than the other 3 corners of the matrix. The (1) corner which is traditionally paired with the ab corner is unmoved by the effect of the spike.

A perfect spike interaction yields contrast sums for both the interaction and the two associated main effects which are equal within measurement error. For example, a perfect AB spike will result in contrast sums of AB, B, and A all being approximately equal. This is why higher order interactions are tested first. For the purposes of the embodiment of the method in Example #3, spike interactions include both perfect spike interactions and approximated spike interactions.

Recognizing a spike interaction is one reason why, in step 8 of the embodiment of the method shown in Example #1, the AC interaction effect was removed from only one response, the ac response. While the effect of the interaction can be mathematically subtracted from both cells (1) and ac using the orthogonal estimate instead of the effect estimate this does not accurately represent what is physically happening. When a spike interaction is subtracted from more cells than is physically warranted the remaining contrasts are artificially large.

Figure 17:
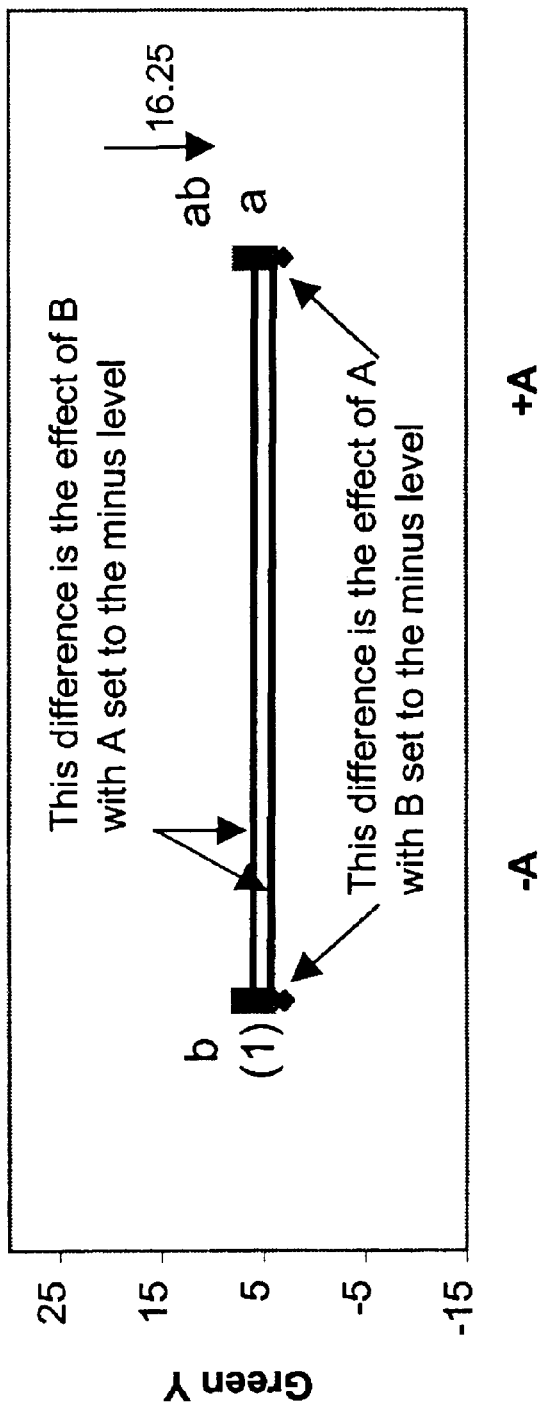
FIG. 17 is FIG. 16 with the AB interaction removed from the ab cell.

For the present Example #3, FIG. 16 should be used to remove the AB interaction when permanently removing its effect. The AB effect is 16, and removing it from the ab cell will achieve the smallest remaining effects, which is in fact, the location of the where the spike interaction occurs. FIG. 17 shows Example #3 with the AB effect removed from the ab cell.

By removing the AB effect from the ab cell, the effect estimate of A is now made with B set to the minus level, and the effect estimate of B is now made with A set to the minus level. This yields useful information in that, since AB has been shown to be the interaction of interest, it will be most desirable to also know the effect of either variable alone with the other set so as not to interact in the spike interaction. Thus, by graphically representing the responses, and removing the interaction effect to achieve the smallest remaining effects, useful information is obtained that can be directly used to determine settings for process variables. The same considerations may be given to where to set the variables as was discussed in Step 12 of Example #1.

EXAMPLE #4

A full factorial experiment was run for a manufacturing process wherein electrical components were being manufactured. Finished parts were failing dielectric testing. Three variables were identified as possible contributors to the problem. The variables were tested using a three-factor full factorial experiment. The response was, arc-volts, the voltage at which the part failed.

The present method identified an AB spike interaction when variables A and B were set at a low value (−). The spike interaction provided the needed response level. Given the consequences of building a weak part, and the cost of setting both A and B to the low level, it was decided to set both A and B to the low level.

Examples #1, #2, #3, and #4, have been directed toward the improvement of a manufacturing process to yield improved product characteristic. Manufacturing processes can include but are certainly not limited to, manufacturing of vehicles parts, vehicles, general electronic apparatus and devices, computers, computer components, scientific apparatus, medical apparatus, chemicals, machinery, foods, construction materials, tools, pharmaceuticals, paper goods and printed matter, paint, rubber goods, leather goods, furniture, housewares, cordage and fibers, fabrics, clothing, fancy goods, toys and sporting goods, and beverages, cosmetics and cleaning preparations, lubricants and fuels/oil, general metal goods, jewelry, firearms, musical instruments, and even the processing of natural goods. However, as will be appreciated, the embodiments of the method have broad applicability. The output responses monitored can be any form of product or article characteristic as well as a characteristic of the fabrication or manufacturing process itself. Thus the improvement sought and achieved through application of any of the various embodiments of the method can include improvements not only to the product or article, but also to the manufacturing or fabrication process. Examples of measurable responses monitored to gage improvements to the process include production rate of the process and any efficiency in the process.

In addition, embodiments of the method can also be used in the operation of a manufacturing process, such as, for example, when a process has temporarily deviated from a target value required for an operating parameter of the process, and it is desired to return the process to normal operation. The previous settings of variables may be unknown, and hence, an embodiment of the present method can be used to return the variables to the previous settings to attain the range sought for the operating parameter. The operating parameter may be related to, but are not limited to, production rates, manufacturing efficiency parameters, and product characteristics of the products generated by the process.

It will also be appreciated that embodiments of the method can be applied to the design of processes and products. Such applications of embodiments of the method may typically be in connection with bench scale models of a manufacturing or fabrication process or prototypes of a product or article. Experimentation can be done on the bench scale, or on the prototypes, and an embodiment of the method can be used to select the correct level settings for the variables.

One skilled in the art will also recognize that the present invention may be implemented through the use of a general purpose computer system. For example, the contents of the worksheet of FIG. 3 may be calculated and stored in the computer in a variety of forms including a spreadsheet, or the iterative steps of the method as well as the graphical interpretations may be done with the computer. An embodiment of the method may be implemented by a computer system, including receiving and adjusting variables through the input/output devices 4, based on the information yielded by the method. In one alternative embodiment, an embodiment of the method is implemented in the computer and a signal is sent to a controller to adjust the level settings of the process variables based on information transformed by the embodiment of the method. Any one of the embodiments of the method may also be stored on a computer readable medium, such as a memory, which can then be used with a computer to perform the method.

Figure 14:
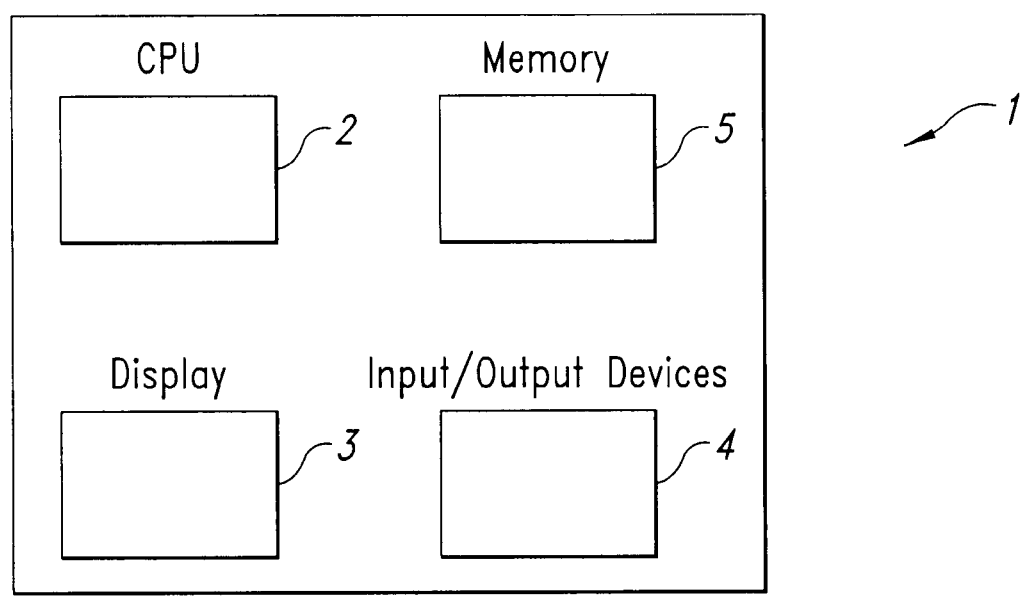
FIG. 14 is a block diagram of a general purpose computer for use with the method.

FIG. 14 is a block diagram of a general purpose computer for practicing preferred embodiments of the present invention. The computer system 1 contains a central processing unit (CPU) 2, a display screen 3, input/output devices 4, and a computer memory (memory) 5.

As the embodiments of the method can be implemented through the use of a general purpose computer system, wherein the particular documents described previously are not necessary, so can the documents be modified and embodied in various forms of display. For example, the worksheet of FIG. 3 may be implemented in a variety of forms. A display could be generated in more tabular form with the fields of the table corresponding to similar notation, or perhaps in graphical form.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for improving a manufacturing process wherein there are a plurality of process variables and a value of a measurable response of the manufacturing process is indicative of an improvement to the process, the method comprising:

conducting a full factorial experiment by setting a plurality of the process variables at a plurality of settings in a plurality of combinations of settings and receiving at least one measurement of the response of the process for each combination of level settings;

calculating individual contrasts for each process variable and each interaction among the process variables using the received at least one measurement response of the full factorial experiment and displaying the individual contrasts and the sums of the contrasts for each variable and each interaction;

verifying that both variables of an interaction contrast must be set at the levels of the interaction to impart an effect substantially equal to the effect of the interaction by evaluating the variance of the contrasts displayed; and setting the process variables using the effect of the interaction on the measurable response of the process;

conducting at least two trials for the full factorial experiment; and displaying at least one hypothetical additional process variable and substituting one set of trial responses as responses for the hypothetical variable and calculating individual contrasts for the hypothetical variable including the interaction contrasts thereof, whereby replicate effects are calculated.

2. The method of claim 1 wherein the process variables are set using the effect of the interaction only when the contrast sum associated with the interaction is greater than any sum of any set of replicate effects.

3. A method of improving a manufacturing process wherein a target is determined for a measurable response, the target being indicative of an improvement in the process, the method comprising:

conducting a full factorial experiment with at least two process variables being adjusted between at least two level settings with output responses being measurements of the response for which the target is determined;

receiving the responses of the full factorial experiment and using the responses to calculate individual contrasts for each process variable and each interaction among the process variables and displaying each of the contrasts in a document at a particular location of the document, with a notation corresponding to the particular location, the notation indicating the level settings of the other of the process variables not involved in the particular contrasts;

adding the individual contrasts of each process variable and each interaction to generate separate contrast sums;

selecting at least one of the contrast sums when it is greater than at least one of the other contrast sums by a pre defined factor; and adjusting the level settings of the process variables using an estimated effect associated with the selected contrast sum, wherein the level settings of the process are adjusted using the estimated effect only if the estimated effect is determined to be significant, wherein determining the significance of the effect comprises sorting the responses and checking an end count.

4. A method of manufacturing wherein there is a required target for a measurable response of the process, the method comprising:

conducting a full factorial experiment by setting a plurality of process variables of the process at a plurality of settings, in a plurality of combinations of settings, and receiving at least one measurement of the response of the process for each combination of level settings;

receiving the responses of the full factorial experiment and using the responses to calculate individual contrasts for each process variable and each interaction among the process variables and displaying each of the contrasts in a display at a particular location of the display, with a notation corresponding to the particular location, the notation indicating the level settings of the other of the process variables not involved in the particular contrasts;

adding the individual contrasts of each process variable and each interaction to generate separate contrast sums;

calculating effects estimates for each of the contrast sums;

identifying contrast sums that are greater than at least one of the other contrast sums;

verifying that both variables of an estimated interaction effect must be set at the levels of the interaction to impart an effect substantially equal to the effect of the interaction by evaluating the variance of the contrasts displayed when the sum of contrasts for that interaction has been identified; and adjusting the level settings of the process variables using at least one of the estimated effects;

conducting at least two trials for the full factorial experiment; and assuming and displaying at least one hypothetical additional process variable and substituting one set of trial responses as responses for the hypothetical variable and calculating individual contrasts for the hypothetical factor including the interaction contrasts thereof, whereby replicate effects are calculated.

5. The method of claim 4 wherein the level settings of the process variables are adjusted using the estimated effect only when the contrast sum associated with the effect is greater than a sum of any set of the replicate effects.

6. The method of claim 4 where the level settings of the process variables are adjusted using the estimated effect only when the estimated effect has been tested and found to be significant.

7. A method of manufacturing wherein there is a required target for a measurable response of the process, the method comprising:

conducting a fall factorial experiment by setting a plurality of process variables of the process at a plurality of settings, in a plurality of combinations of settings, and receiving at least one measurement of the response of the process for each combination of level settings;

receiving the responses of the full factorial experiment and using the responses to calculate individual contrasts for each process variable and each interaction among the process variables and displaying each of the contrasts in a display at a particular location of the display, with a notation corresponding to the particular location, the notation indicating the level settings of the other of the process variables not involved in the particular contrasts;

adding the individual contrasts of each process variable and each interaction to generate separate contrast sums;

calculating effects estimates for each of the contrast sums;

identifying contrast sums that are greater than at least one of the other contrast sums;

verifying that both variables of an estimated interaction effect must be set at the levels of the interaction to impart an effect substantially equal to the effect of the interaction by evaluating the variance of the contrasts displayed when the sum of contrasts for that interaction has been identified; and adjusting the level settings of the process variables using at least one of the estimated effects, where the level settings of the process variables are adjusted using the estimated effect only when the estimated effect has been tested and found to be significant, wherein testing the significance of an estimated effect comprises removing an effect previously found to be significant, sorting the responses, and checking an end count.

8. The method of claim 7 wherein when the effect previously found to be significant is an interaction effect, it is removed non-orthogonally and individual contrasts are all recalculated.

9. The method of claim 8 wherein when the effect previously found to be significant is not an interaction it is removed orthogonally.

* * * * *